| United States Patent [19] | [11] Patent Number: 4,736,389 |
| Debus, Jr. et al. | [45] Date of Patent: Apr. 5, 1988 |

[54] TECHNIQUE FOR SYNTHESIZING THE MODULATION OF A TIME VARYING WAVEFORM WITH A DATA SIGNAL

[75] Inventors: Walter Debus, Jr., Nottingham, N.H.; Howard C. Reeve, III, Methuen; Curtis A. Siller, Jr., Andover, both of Mass.

[73] Assignees: American Telephone and Telegraph Company, New York, N.Y.; Bell Telephone Laboratories, Incorporated, Murray Hill, N.J.

[21] Appl. No.: 892,232

[22] Filed: Aug. 4, 1986

[51] Int. Cl.⁴ ............................................. H04L 27/04
[52] U.S. Cl. ...................................... 375/59; 364/721; 332/9 R
[58] Field of Search ..................... 375/39, 52, 53, 54, 375/59, 67, 43, 61; 340/347 DD; 364/721; 328/14; 332/31 R, 9 R, 10; 370/70, 110.2

[56] References Cited

U.S. PATENT DOCUMENTS

| | | |
|---|---|---|
| 3,763,364 | 10/1973 | Deutsch et al. ...................... 364/718 |
| 4,327,419 | 4/1982 | Deutsch et al. ...................... 364/717 |
| 4,493,082 | 1/1985 | Cumberton et al. .................. 375/39 |
| 4,586,023 | 4/1986 | Thompson ................... 340/347 DD |
| 4,599,583 | 7/1986 | Shimozono et al. ............... 332/9 R |
| 4,613,976 | 9/1986 | Sewerinson et al. ................. 375/52 |
| 4,646,326 | 2/1987 | Backof, Jr. et al. .................. 375/39 |

*Primary Examiner*—Benedict V. Safourek
*Attorney, Agent, or Firm*—David R. Padnes

[57] ABSTRACT

A technique for digitally synthesizing the amplitude modulation of one or more carrier signals with a random digital data signal is disclosed. Pursuant to the present invention, a memory unit is addressed by a plurality of binary coded digital symbols in the data signal. For each address, at least two digital representations are read out. Each representation corresponds to a different sample of the carrier signals which has been amplitude modulated by a composite of the spectrally shaped data signal. The disclosed technique can be adapted to synthesize a variety of modulation formats, and can provide compensation for fixed in-rail and cross-rail distortions.

18 Claims, 8 Drawing Sheets

TECHNIQUE FOR SYNTHESIZING THE MODULATION OF A TIME VARYING WAVEFORM WITH A DATA SIGNAL

TECHNICAL FIELD

The present invention relates to a digital synthesis technique which produces a spectrally shaped and amplitude modulated time varying waveform from a random digital data signal.

BACKGROUND OF THE INVENTION

Many communication systems utilize a modulation format in which a digital data signal modulates the amplitude of a time varying waveform or carrier signal. To increase the information-carrying capacity of the system, this modulation process is often performed simultaneously using two digital data signals wherein one data signal modulates the amplitude of a carrier signal, and the other data signal modulates the amplitude of a phase quadrature carrier signal of the same frequency. This modulation of phase quadrature carrier signals is referred to by a variety of names, such as quadrature amplitude modulation (QAM), phase shift keying (PSK), or amplitude and phase shift keying (APSK). The information represented by the digital data signal is, of course, virtually limitless and can represent voice, video, facsimile and the like. Moreover, the transmission channel propagating the modulated carriers is also not limited and, at present, may include air, wire or lightguide.

In communication systems which modulate the amplitudes of quadrature-related carrier signals, each data signal is converted into a mutli-level signal before being spectrally shaped into a continuous waveform by Nyquist filtering. Each of these continuous waveforms is then supplied to a multiplier for modulating the amplitude of an associated one of the quadrature-related carrier signals. Finally, the modulated carriers are then summed into one signal which is transmitted or further processed prior to transmission. One problem with the above described signal processing is that it is typically provided by analog circuitry which is expensive and not readily adaptable to design changes. For example, changing the baud rate can require time consuming redesign of the Nyquist filter. Another disadvantage is that the described circuit implementations cannot use baseband signal shaping to compensate for cross-rail distortions generated by the signal processing or transmission medium. Still another disadvantage is that time-consuming adjustment of an oscillator network can be required to generate the quadrature-related carrier signals.

In one recent development, described in a U.S. patent application to W. Debus, Jr. et al, entitled "Digital Synthesis Technique for Pulses Having Predetermined Time and Frequency Domain Characteristics", Ser. No. 517,803, filed July 27, 1983 and assigned to the present assignee, some of the prior art limitations are eliminated. As disclosed, a memory based technique is used to provide spectral shaping of the data signals thereby eliminating the analog Nyquist filters. In addition, the values stored in the memory can be adjusted so as to compensate for in-rail distortion. This improvement, however, still requires the need for oscillator based circuitry to generate the quadrature-related carriers, multipliers to perform the modulation of the carriers, and an adder to sum the modulated carrier signals. In addition, the disclosed technique cannot compensate for cross-rail distortions. Accordingly, the digital synthesis of the amplitude modulation of a carrier signal with spectrally shaped data signals which can provide in-rail and cross-rail distortion compensation would be desirable.

SUMMARY OF THE INVENTION

The present invention digitally synthesizes the amplitude modulation of a carrier signal by a spectrally-shaped digital data signal. In accordance with the present invention, a memory unit is addressed by a plurality of digital symbols in a data signal. Each digital symbol, depending on the system application, is equal to one or more bits of the data signal. For each address, at least two digital representations are read out from the memory unit. Each digital memory unit output represents a different sample of a time varying carrier signal having a frequency which is a rational multiple of the symbol rate and which has been amplitude modulated by a composite of spectrally-shaped impulse time functions which are temporally displaced from one another and weighted by a different digital symbol in the memory address.

In accordance with one aspect of the present invention, the described digital synthesis can be adapted to synthesize the amplitude modulation of two quadrature-related carrier signals by digital data signals. Advantageously, the present invention may also be adapted so as to provide compensation for in-rail and cross-rail distortions, when required.

DETAILED DESCRIPTION

Figure 1:
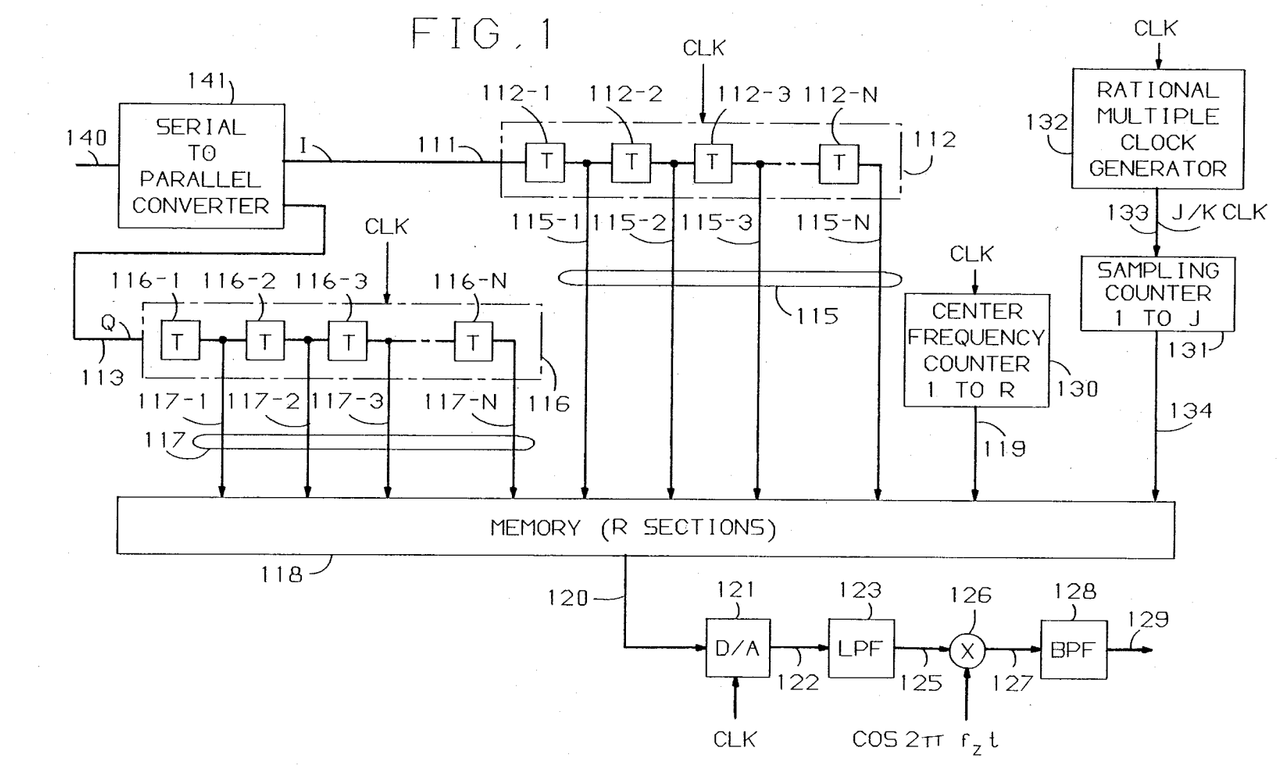
FIG. 1 is a block diagram of an embodiment of the present invention adapted to synthesize the amplitude modulation of quadrature-related carrier signals.

FIG. 1 shows the use of the present invention within the transmitter of an illustrative communications system utilizing QAM modulation. As shown in FIG. 1, bits of a digital data signal, on lead 140 are coupled through serial-to-parallel converter 141 to buses 111 and 113. Buses 111 and 113 each comprise a plurality of parallel conductors wherein the number of conductors in each bus varies with the modulation format being synthesized and, more specifically, is equal to the number of bits per digital symbol. In 16 QAM modulation, for example, buses 111 and 113, commonly referred to as the I rail and Q rail, respectively, each include 2 conductors since each modulated carrier signal conveys information on four discrete amplitude levels. Therefore, there are 2 bits per symbol on each rail. Or, for example, in 64 QAM modulation where information is carried on 8 distinct amplitudes of a carrier signal, there are 3 bits per symbol on each rail. In any case, converter 141 spreads successive bits of the data signal on lead 140 across the combined total number of leads in buses 111 and 113.

The data bits appearing on buses 111 and 113, respectively designated as I and Q, are coupled through digital tapped delay lines 112 and 116 in parallel. Each delay line, clocked by the baud rate clock CLK, comprises a plurality of delay elements 112-1 through 112-N and 116-1 through 116-N. Each of these delay elements provide a delay of one baud or symbol interval T.

Buses 115-1 through 115-N and 117-1 through 117-N respectively couple the delayed bits from delay lines 112 and 116 to memory 118 and form a predetermined portion of the memory address. At any time, this predetermined portion of the memory address comprises successive bits from buses 111 and 113 which represent a digital symbol from each bus and a number of digital symbols preceding and succeeding the digital symbol. Over time, therefore, converter 141 and delay lines 112 and 116 serve to arrange the data signals on lead 140 into overlapping portions each comprising M times N bits, where M is equal to the number of data bits per symbol per rail and N is equal to the number of tapped data symbols from each delay line. It should be noted that since the sequence of bits on lead 140 in the disclosed embodiment is random, so is that portion of the memory address provided by delay lines 112 and 116. The remainder of each address for memory 118 comprises the signals on buses 119 and 134.

For each random address generated by 112 and 116, memory 118 reads out onto bus 120 at least two digital representations. Each digital representation corresponds to a different sample of amplitude modulated quadrature-related carrier signals wherein the amplitude of each carrier has been modulated by a composite of specifically-shaped impulse time functions which are temporally displaced from one another and weighted by the successive digital symbols appearing on a different one of the buses 115 and 117. To more fully appreciate the synthesis provided in FIG. 1, and the substantial reduction in circuit complexity, turn now to FIG. 2 which shows a prior art 16 QAM modulator.

Figure 2:
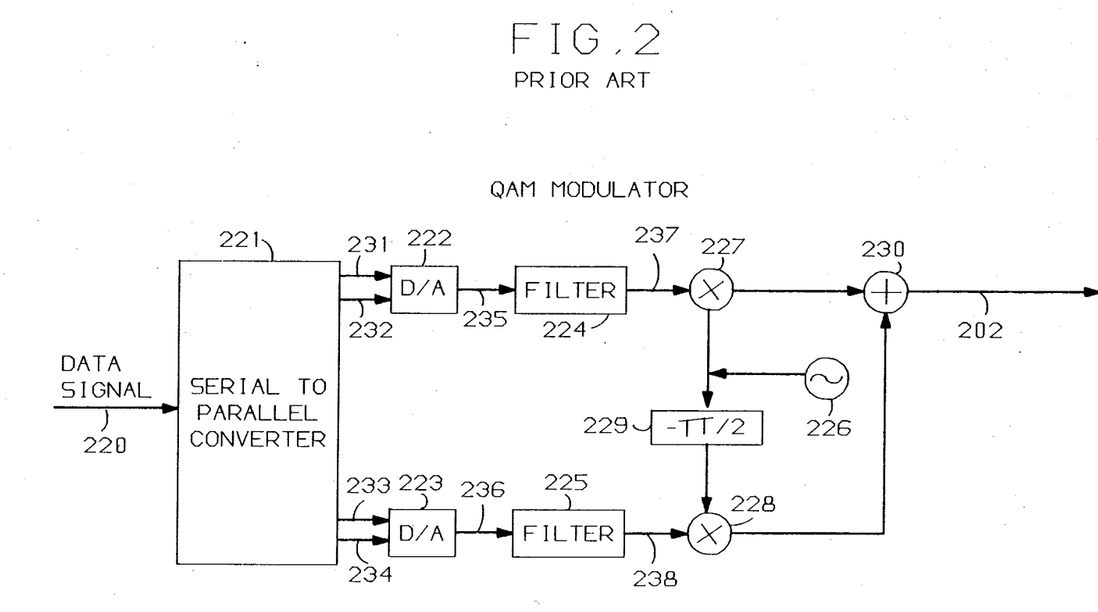
FIG. 2 is a block diagram of a prior art circuit which provides amplitude modulation of quadrature-related carrier signals.

As shown in FIG. 2, in a prior art 16 QAM modulator, the digital data signal on lead 220 is coupled to serial-to-parallel converter 221 which spreads successive bits of the data signal onto leads 231 through 234, respectively. Digital-to-analog (D/A) converter 222 quantizes signals appearing on leads 231 and 232 into a number of signal voltages which appear on lead 235. Similarly, D/A converter 223 quantizes the signals on leads 233 and 234 into a number of signal voltages which are coupled to lead 236. For the case of 16 QAM modulation, 4 signal voltages appear on lead 235. Multipliers 227 and 228 receive the signal voltages on leads 235 and 236 after they are respectively smoothed by filters 224 and 225, which are typically half-Nyquist filters but could provide more arbitrary spectral shaping. Multiplier 227 modulates the amplitude of a carrier signal generated by oscillator 226 with the signals on lead 235 after filtering. In similar fashion, multiplier 228 modulates the amplitude of a second carrier signal with the signals on lead 236 after smoothing by filter 225. The second carrier signal supplied to multiplier 228 is generated by shifting the carrier signal generated by oscillator 226 by minus $\pi/2$ radians via phase shifter 229. Hence, the pair of carrier signals supplied to multipliers 227 and 228 are in phase quadrature to one another and the products provided by multipliers 227 and 228 are each double-sideband signals. Summer 230 then adds the products provided by multipliers 227 and 228 and outputs this sum, also a double-sideband signal, onto lead 202.

Figure 3:
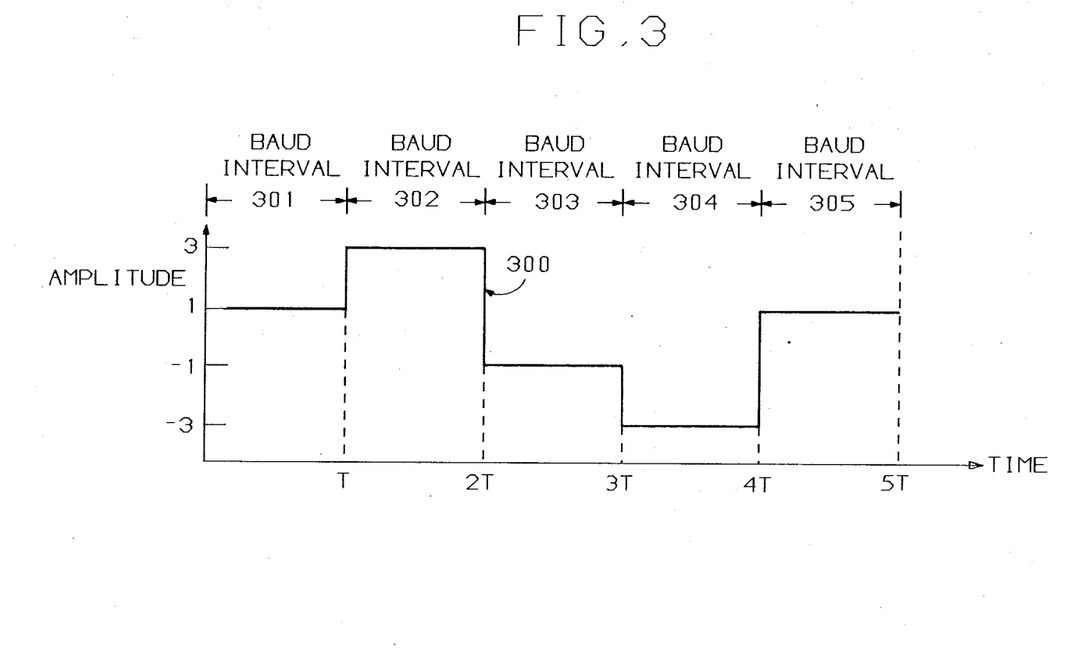
FIG. 3 depicts a time domain representation of the waveform on leads 235 and 236 of FIG. 2 for a 4-level signal.

FIG. 3 shows an illustrative time-varying waveform 300 appearing at the output of a typical D/A converter 222 or 223 of FIG. 2 for the 16 QAM system wherein the permissible transmitted symbols are $\pm 1$ and $\pm 3$ volts. The waveform has been idealized in the sense that the rise and fall times are non-existent. Waveform 300 has an amplitude that changes value randomly among the permissible transmitted symbols after each baud interval T. This randomness is indicated by waveform 300 having an amplitude of $+1$, $+3$, $-1$, $-3$, and $+1$ volts during baud intervals 301, 302, 303, 304 and 305, respectively. In the frequency domain, the spectrum of waveform 300 has the typical (sin x/x) shape, where x is a well-known function of frequency.

Figure 4:
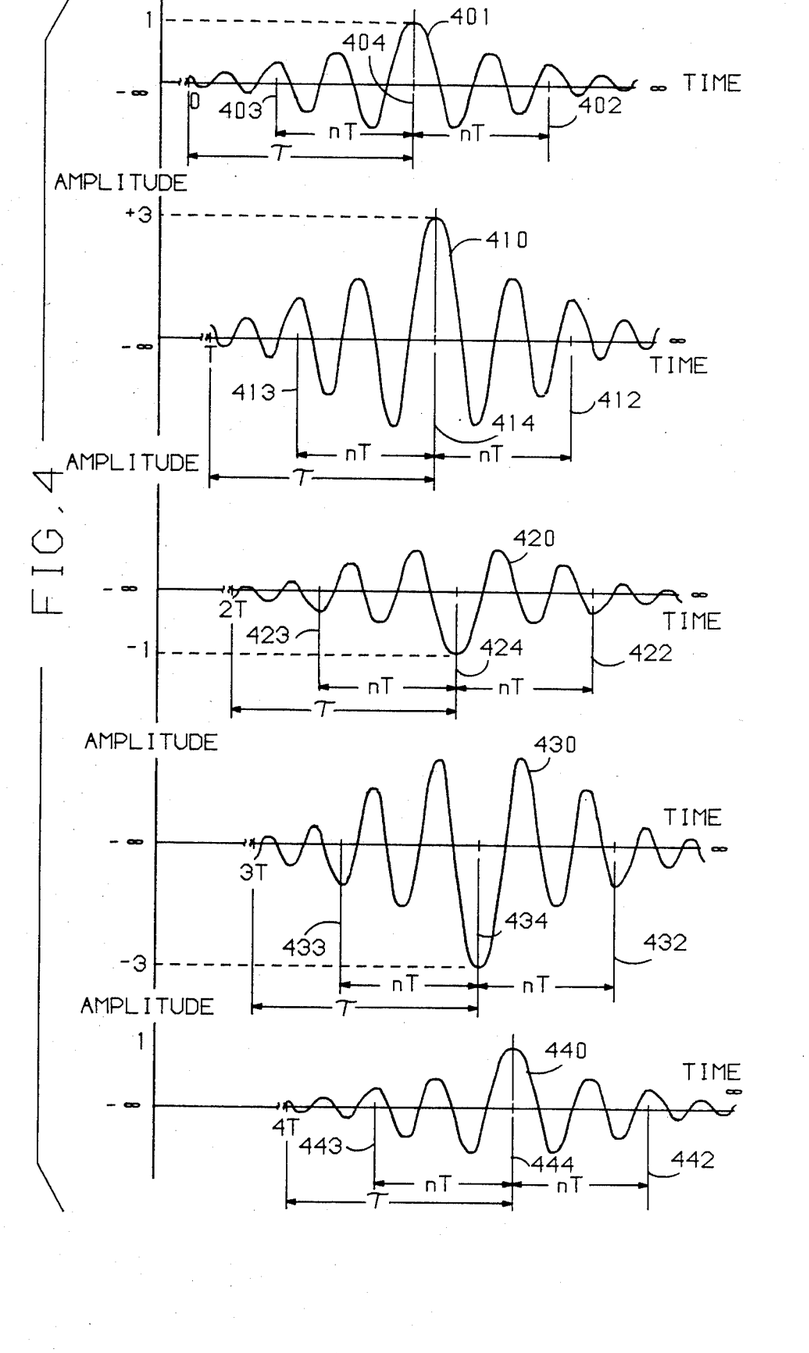
FIGS. 4 and 5 depict a time domain representation of the half-Nyquist filtered digital symbols which are relevant to an understanding of the present invention.
Figure 5:
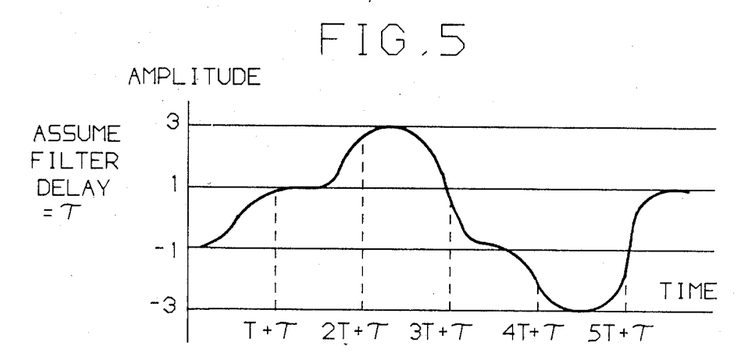

FIG. 4 shows the square pulse response 401 of an idealized half-Nyquist filter 224 or 225 of FIG. 2 including x/(sin x) compensation, with the square impulse being the isolated portion of waveform 300 during baud interval 301. It should be noted that filter 224 or 225 has a signal propagation delay $\tau$ and that the impulse response 401 to a band-limited digital symbol "rings out" or spreads forever in time. The maximum amplitude of response 401 is proportional to the amplitude of waveform 300 during the associated baud interval, i.e., baud interval 301, or, equivalently is proportional to the value of the associated digital symbol. This maximum amplitude is achieved a time interval $\tau$ after the beginning of the associated baud interval. Similarly, waveforms 410, 420, 430 and 440 show the responses of filter 224 or 225 to waveform 300 during baud intervals 302, 303, 304 and 305, respectively. Each of these responses extends forever in time and possesses the impulse response of FIG. 4 weighted by the associated data symbol. Accordingly, the maximum values of impulse responses 410, 420, 430 and 440 are respectively equal to $+3$, $-1$, $-3$, and $+1$ volts. The time-varying waveform on lead 237 or 238 of FIG. 2 during any baud interval is, therefore, theoretically equal to a composite of the filter impulse response from this baud interval and the filter impulse responses from all preceding and succeeding baud intervals. This superposition of identical, time displaced unit impulse time functions, each weighted by its associated digital symbol appearing on lead 237 or 238, is illustrated in FIG. 5. It should be understood, of course, that the digital symbols on leads 237 and 238 are random and independent of one another and, hence, so are the resulting composite time-varying waveforms.

The signal synthesized by the embodiment of FIG. 1 is the sum of the composite function on leads 237 and 238 each multiplied by an associated carrier signal. This modulated signal, designated as f(t), can be expressed as:

$$f(t) = a(t) \cos 2\pi f_c t + b(t) \sin 2\pi f_c t; \quad (1)$$

where $f_c$ is of oscillator 226; and a(t) and b(t) are the composite waveforms on leads 237 and 238, respectively.

Figure 6:
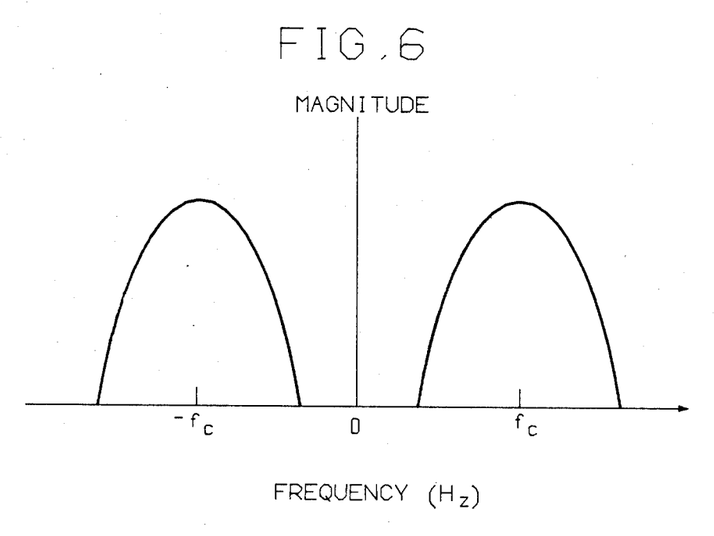
FIG. 6 shows the frequency spectrum of a QAM signal synthesized by the present invention.

Signal f(t) is a double-sideband signal and has the frequency spectrum shown in FIG. 6.

Pursuant to the present invention, the synthesis of f(t) is achieved by respectively approximating a(t) and b(t) during any given baud interval by composite waveforms a'(t) and b'(t) where each composite waveform is an aggregation of weighted impulse response during the given baud interval and a predetermined, finite number of weighted impulse responses from adjacent baud intervals. Typically, these adjacent baud intervals are successive and immediately precede and succeed the given baud interval. This approximation provides a satisfactory result since the magnitude of the filter impulse response decays rapidly with time.

In FIG. 4, lines 402 and 403 indicate the truncation of impulse response 401 some integer number of baud intervals, n, before and after the time 404 at which the absolute value of the amplitude is a maximum. Hereinafter, we will refer to times, such as 404, as a maximum magnitude time. For sake of simplicity, the truncation of response 401 is symmetric with respect to maximum amplitude time 404. However, this need not be so. For example, each response could be truncated 5 baud intervals before and 3 baud intervals after time 404. The truncated response 401 extends over 2n baud intervals lying between lines 402 and 403 and is zero everywhere else. This truncation process can be repeated for the other illustrated impulse responses. Lines 412, 413 and 422, 423 and 432, 433 and 442, 443 respectively indicate the truncation of responses 410, 420, 430 and 440 n baud intervals before and after maximum magnitude times 414, 424, 434, and 444. Viewing the truncated impulse responses, it should now be apparent that any truncated impulse response is only affected by a finite number of surrounding truncated impulse responses. Now, the portion of each truncated impulse response within a one baud interval wide window extending from the maximum magnitude time can be combined with the contributions in this window from the finite number of surrounding impulse responses. Successively combining these composites for the truncated impulse responses associated with leads 237 and 238 respectively form a'(t) and b'(t). Waveforms a'(t) and b'(t) each approximate a waveform similar to that shown in FIG. 5. Of course, this approximation is respectively better or worse as n gets larger or smaller.

Now refer back to FIG. 1. Memory unit 118 produces a digital representation of signal f'(t) wherein $$f'(t)=a'(t) \cos 2\pi f_c't + b'(t) \sin 2\pi f_c't; \text{ and} \quad (2)$$

where
a'(t) and b'(t) are each a composite waveform formed by a finite number of time-displaced impulse responses each truncated after n baud intervals and each weighted by an associated data symbol and;
$f_c'$ is a predetermined frequency that is some rational multiple of the baud rate.

During each baud interval, bus 115 supplies memory 118 with a set of N binary coded digital symbols used to form a'(t) for this baud interval and bus 117 supplies memory 118 with the other set of N binary coded digital symbols used to form b'(t).

The number of digital symbols, N, in each set is a function of where the filter impulse response is truncated. Specifically, consistent with the above discussion, $$N=2n+1; \quad (3)$$

where 2n is the number of baud intervals over which the truncated impulse response extends.

For the sets of symbols encoded on buses 115 and 117, during each baud interval, memory 118 reads out the value of a'(t) sin $2\pi f_c't + b'(t)$ cos $2\pi f_c't$ at two or more equally spaced times. Finally, $f_c'$ is restricted to be a rational multiple of the baud rate equal to or greater than ½ of the baud rate. This requirement that $f_c'$ be a rational multiple of the baud rate is necessary for digital synthesis, for without it, an infinite memory 118 is required. (The bit rate, of course, is an integer multiple of the baud rate for a maximum efficiency.) A rational multiple is defined as the quotient of two nonzero integers and we shall represent this rational multiple as P/R, where we shall assume that it is a reduced fraction, and we define P and R as positive integers. While $f_c'$ can be any rational multiple of the baud rate, integer multiples, i.e., R=1, are easiest to implement.

The number of digital representations read out from memory 118 per baud interval must satisfy the Nyquist sampling theorem if f'(t) is to be reconstructed. For the present invention, this theorem is satisfied so long as the number of digital representations read out per baud interval is a rational multiple of the baud rate which avoids aliasing in the output signal frequency spectrum which is subsequently transmitted. This rational multiple is designated as J/K where J/K>Z, a number which varies with each application and which cannot be less than 2. We again shall assume that J/K is a reduced fraction, and that J and K are positive integers. The output signal of the present invention appears on lead 129 or, as will be discussed, appears on lead 125 in systems applications where multiplier 126 and band pass filter 128 are not required.

Sampling counter 131 contributes the portion of each memory 118 address which determines the number of digital representations read out per baud interval. This portion appears on bus 134. Counter 131 is clocked by a clocking signal on bus 133 which is equal to J/K times the baud rate. Rational multiple clock generator 132 produces this clocking signal from the baud rate clock CLK. Of course, reading out an integer number of digital representations per baud interval, i.e., K=1, is generally easiest to implement.

Center frequency ($\omega_c'$) counter 130, where $\omega_c' = 2\pi f_c'$, produces the portion of each memory 118 address that controls the section of memory 118 which is to be accessed for a given set of digital symbols on buses 115 and 117 in any baud interval. Counter 130, clocked by CLK, is required whenever $\omega_c'$ is some non-integer, rational multiple P/R times CLK. As will be shown, there are R different digital representations for any set of digital symbols on buses 115 and 117, and, consequently, counter 130 counts from 1 to R and then resets.

Figure 7:
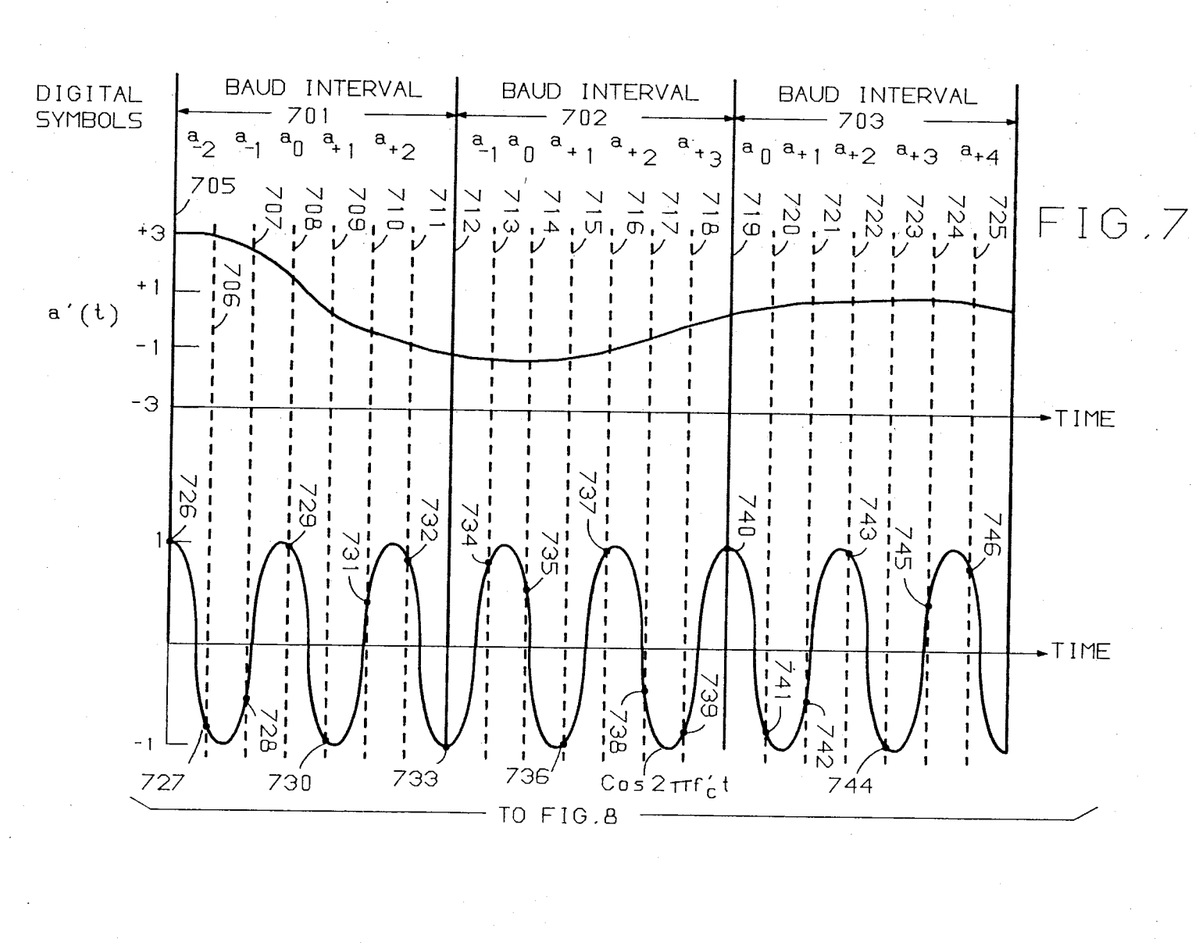
FIGS. 7 and 8 depict how the information stored in memory unit 118 is determined.
Figure 8:
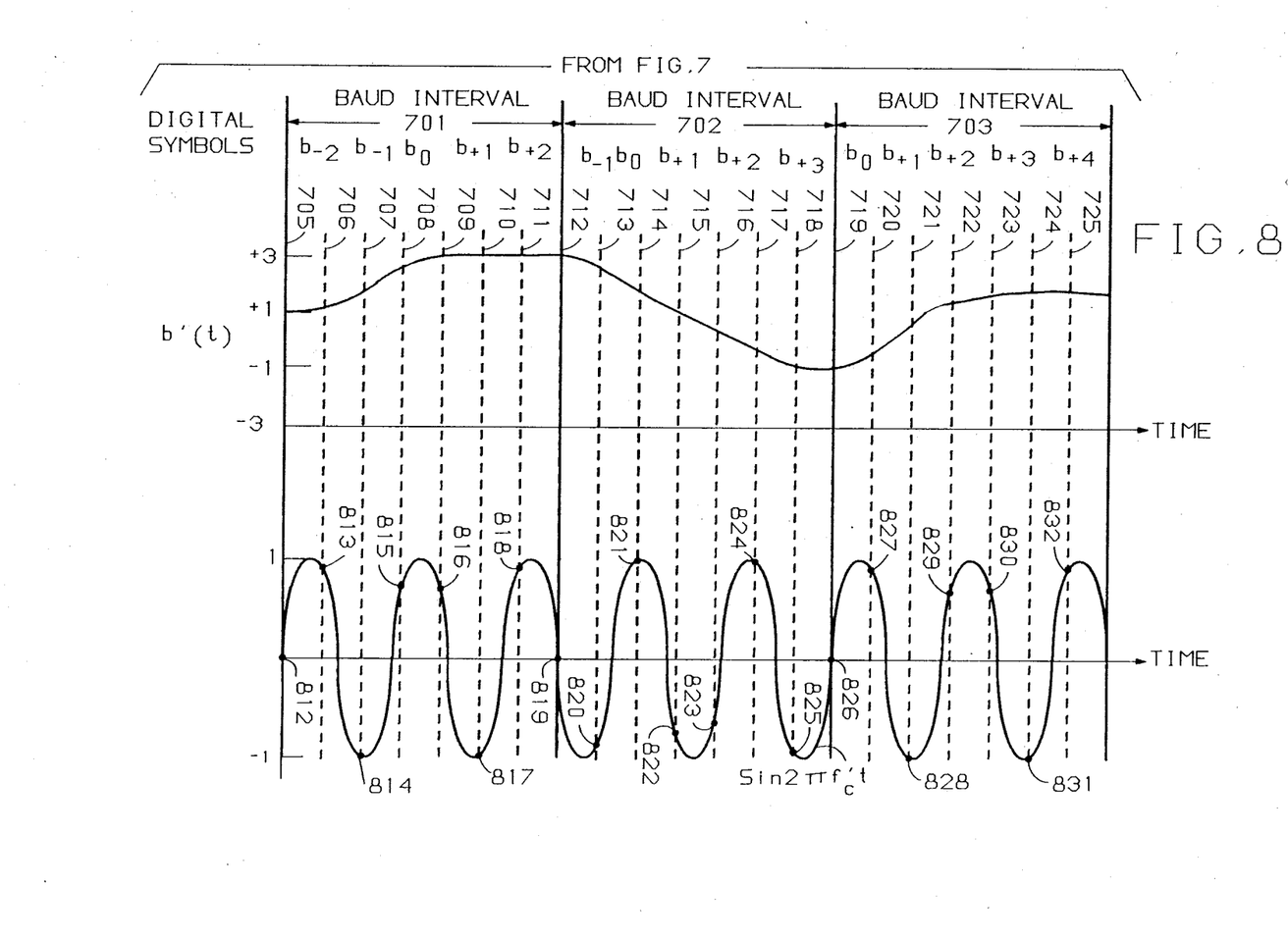

Refer now to FIGS. 7 and 8 which show how the digital representations stored in memory 118 are determined. Depicted in FIGS. 7 and 8 are the successive digital symbols stored in delay lines 112 and 116 of FIG. 1, for consecutive baud intervals 701, 702 and 703, assuming N=5. The current digital symbols in baud interval 701 which appear as buses 111 and 113 are respectively designated as $a_o$ and $b_o$ with past and future symbols designated with negative and positive subscripts, respectively. Of course, the numerical values of the subscripts indicate the temporal proximity, in baud or symbol intervals, to the currently transmitted digital symbol. In baud intervals 702 and 703, which are respectively one and two baud intervals after baud interval 701, the current digital symbols are respectively $a_1$, $b_1$ and $a_2$, $b_2$.

Waveform a'(t) in FIG. 7 illustrates the composite waveform formed by superimposing each baud interval with the 5 displaced, truncated impulse responses, each individually weighted by the 5 digital data symbols stored in delay line 112 during each baud interval. Similarly, waveform b'(t) illustrates the composite waveform formed by repeating this aggregation process each baud interval for the digital symbols stored in delay line 116. To construct the modulation of a'(t) cos $2\pi f_c't + $b'(t) sin $2\pi f_c't$, the sum of these products must be determined for some predetermined number of equally spaced sampling times per baud interval which satisfies the Nyquist theorem. This sum for each sampling time is then stored within a different location of memory 118.

In FIGS. 7 and 8, we have assumed that the sampling rate is 7 times CLK and that $f_c' = 5/2$ CLK. The sampling times have been designated as 705 through 725 and the values of cos $2\pi f_c't$ and sin $2\pi f_c't$ at these times are respectively designated by points 726 through 746 and 812 through 832. It should be noted that since $f_c'$ is not an integer multiple of CLK, the values of cos $2\pi f_c't$ and sin $2\pi f_c't$ at sampling times 705 through 711 are different than the value at times 712 through 718. However, after 2 baud intervals, cos $2\pi f_c't$ and sin $2\pi f_c't$ each complete an integer number of cycles. As a result, the values of cos $2\pi f_c't$ and sin $2\pi f_c't$ at times 705 through 711 are respectively the same as that at times 719 through 725. Consequently, for a given set of digital symbols in delay lines 112 and 116 and quadrature-related carrier signals whose frequency is a rational multiple P/R times the baud rate, memory unit 118 of FIG. 1 must store R different sets of digital representations of f'(t). Furthermore, since each digital representation corresponds to a sample of f'(t) in a baud interval, the number of digital representations in each set is equal to the number of sampling times for the baud interval. The selection of the particular set of digital representations is determined by the count of center frequency counter 130, while the count of counter 131 sequentially arranges the plurality of stored digital representations per set. For example, the memory 118 location storing the digital representations of f'(t) at sampling times 705 and 706 has the addresses $a_{-2}a_{-1}a_0a_{+1}a_{+2}b_{-2}b_{-1}b_0b_{+1}b_{+2}$00000 and $a_{-2}a_{-1}a_0a_{+1}a_{+2}b_{-2}b_{-1}b_0b_{+1}b_{+2}$00010, where the 000 and 001 which precede the last bit positions indicate the count of sampling counter 131 and the 0 in the last bit position indicates the count of center frequency counter 130. In this case, sampling counter 131 would count from 0 to 6, whose binary representations are 000 and 110, respectively, and center frequency counter 130 would count from 0 to 1. Similarly, the addresses for the digital representations of f'(t) at sampling times 712, 713, 719 and 720 respectively are $a_{-1}a_0a_{+1}a_{+2}a_{+3}b_{-1}b_0b_{+1}b_{+2}b_{+3}$0001, $a_{-1}a_0a_{+1}a_{+2}a_{+3}b_{-1}b_0b_{+1}b_{+2}b_{+3}$0011, $a_0a_{+1}a_{+2}a_{+3}a_{+4}b_0b_{+1}b_{+2}b_{+3}b_{+4}$0000, $a_0a_{+1}a_{+2}a_{+3}a_{+4}b_0b_{+1}b_{+2}b_{+3}b_{+4}$0010.

Figure 9:
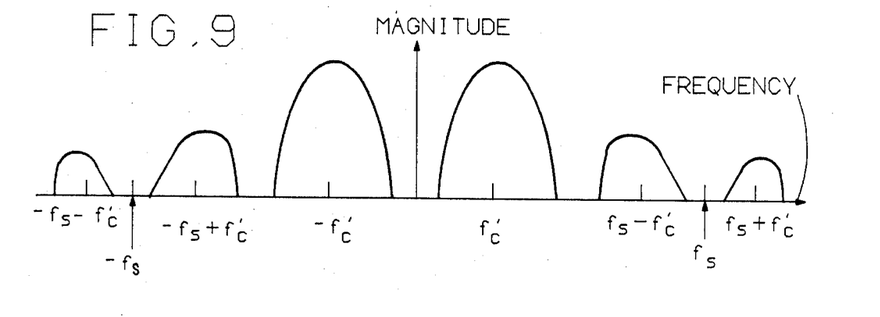
FIGS. 9 through 11 show the frequency spectrum at different points in the apparatus of FIG. 1.
Figure 10:
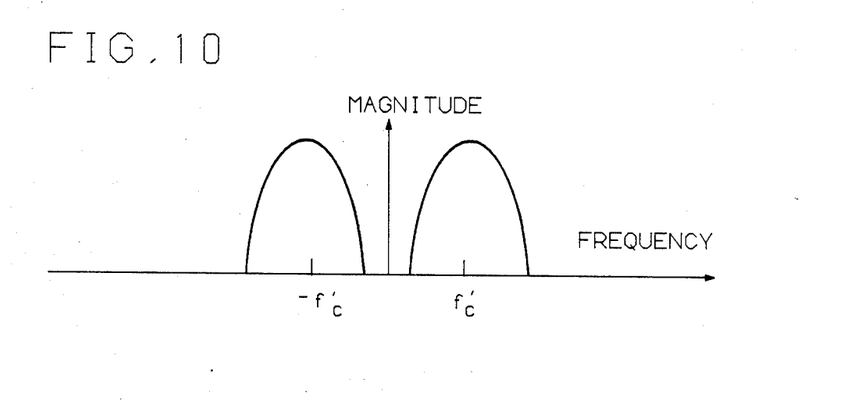
Figure 11:
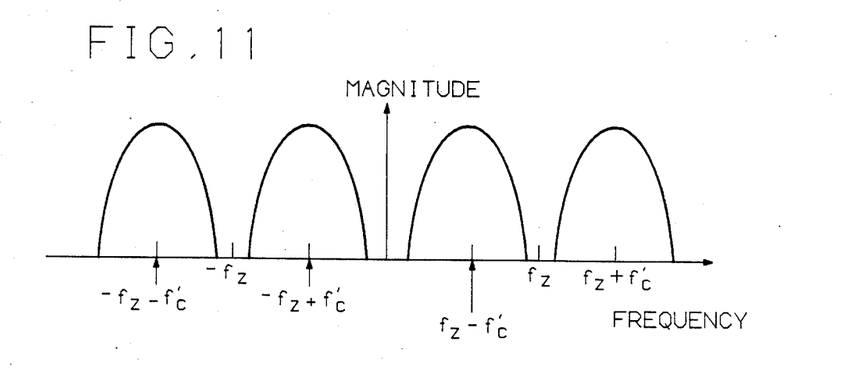

The digital representations read out of memory 118 appear on bus 120 and are coupled to D/A converter 121 which creates an analog waveform on lead 122. This analog waveform has the spectrum shown in FIG. 9, where $f_s$ is equal to the sampling frequency. Low pass filter 123 eliminates harmonics from this spectrum yielding a signal spectrum on lead 125 that is shown in FIG. 10. As discussed hereinabove, in the present synthesis technique, the frequency of the quadrature-related carrier signals is restricted to be a rational multiple of the baud rate. In certain applications, however, it may be desirable or necessary for the transmitted carrier frequency to be at some arbitrary frequency, $f_c$, which is not a rational multiple of the baud rate. In this event, multiplier 126 is connected to lead 125 to multiply the filtered spectrum by cos $2\pi f_z t$, where $f_z = f_c - f_c'$ or $f_z = f_c + f_c'$ depending on which is more feasible. For the case where $f_z = f_c - f_c'$, the signal spectrum created by multiplier 126 on lead 127 is shown in FIG. 11. Band pass filter 128 is then utilized to eliminate the unwanted portion of the spectrum caused by the frequency translation and produce the spectrum shown in FIG. 6 and appearing on lead 129. When $f_z = f_c - f_c'$, a high pass filter would suffice for filter 128, while a low pass filter can be utilized for filter 128 when $f_z = f_c + f_c'$.

It should, of course, be understood that while the present invention has been described in reference to an embodiment, numerous modifications can be made without departing from the spirit and scope of the present invention. First, for example, the present invention can be used to synthesize the amplitude modulation of a single carrier by a data signal. Second, the digital representations stored in memory 118 can be improved to compensate for in-rail and cross-rail distortions. In regard to the former, for example, the (sin x)/x characteristic shape in the output signal from D/A converter 121 can be compensated for by pre-emphasizing the signal stored in memory 118 with x/(sin x). Such compensation can also be provided for a single amplitude modulated carrier signal. Third, while counters 130 and 131 contribute to each address, the former counter is not required when $f_c'$ is an integer multiple of the baud rate and the latter counter can be replaced with well-known circuitry at the memory output which arranges the multiple digital representations read out for a single address to the appropriate sequential order. Fourth, while the present invention has been disclosed with reference to the synthesis of half-Nyquist filtering, other spectral shapes, for example, the spectrum associated with full-Nyquist filtering or partial response signaling can also be synthesized. Indeed, the present invention can synthesize virtually any arbitrary spectral shape. Finally, while memory 118 comprises a single memory of R sections, two memory units can be used, one storing a'(t) cos $2\pi f_c't$ and the other storing b'(t) sin $2\pi f_c't$, along with a summer in lieu of memory 118.

What is claimed is:

1. Waveform synthesizing apparatus comprising accessing means for successively converting a prescribed number of bits in a binary input data signal into first and second sequences of digital signals;

means for outputting at least two digital representations of an analog waveform in response to each of said first and each of said second sequences, said analog waveform being of the type resulting from the repetitive summation of a first amplitude modulated carrier signal and a second amplitude modulated carrier signal that is in phase quadrature with the first carrier signal, the amplitude of one of said carrier signals being modulated by a composite of impulse time functions temporally displaced from one another wherein each impulse time function is weighted by a first predetermined number, each first number being determined by at least one associated digital signal in said first sequence and the amplitude of said other one of said carrier signals being modulated by a composite of impulse time functions temporally displaced from one another wherein each impulse time function is weighted by a second predetermined number, each second number being determined by at least one associated digital signal in said second sequence; and means responsive to said outputting means for converting said digital representations to said analog waveform.

2. The apparatus of claim 1 wherein said accessing means comprises a plurality of delaying means for producing said digital/signal sequences.

3. The apparatus of claim 2 wherein said accessing means comprises a serial to parallel converter which supplies parallel bitstreams to said delaying means.

4. The apparatus of claim 1 wherein said input data signal has a bit rate and said outputting means outputs digital representations of said first and second amplitude modulated carrier signals, said carrier signals having a common frequency which is a rational, non-integer multiple of said bit rate.

5. The apparatus of claim 1 wherein said input data signal has a bit rate and said outputting means outputs digital representations of said first and second amplitude modulated carrier signals, said carrier signals having a common frequency which is an integer multiple of said bit rate.

6. The apparatus of claim 1 wherein said outputting means comprises means for arranging said digital representations outputted in response to each sequence into a predetermined order.

7. The apparatus of claim 6 wherein said arranging means comprises a counter which is connected to said outputting means.

8. The apparatus of claim 1 wherein said outputting means comprises a memory.

9. The apparatus of claim 1 wherein each of said amplitude modulated carrier signals comprise distortion and said digital representations compensate for this distortion.

10. The apparatus of claim 1 wherein said amplitude modulated carrier signal comprises distortion and said digital representations compensate for this distortion.

11. Waveform synthesizing apparatus comprising
accessing means for successively converting a prescribed number of bits in a binary input data signal into a sequence of digital signals;

means for outputting at least two digital representations of an amplitude modulated carrier signal in response to each sequence, said amplitude modulated carrier signal being of the type resulting from the modulation of the carrier signal amplitude by a composite of impulse time functions temporally displaced from one another and wherein each impulse time function is weighted by a predetermined number, each number being determined by at least one associated digital signal in said sequence; and means responsive to said outputting means for converting said digital representations to said amplitude modulated carrier signal.

12. The apparatus of claim 11 wherein said accessing means comprises a plurality of delaying means for producing said sequence.

13. The apparatus of claim 12 wherein said accessing means comprises a serial to parallel converter which supplies parallel bitstreams to said delaying means.

14. The apparatus of claim 11 wherein said outputting means comprises means for arranging said digital representations outputted in response to each sequence into a predetermined order.

15. The apparatus of claim 14 wherein said arranging means comprises a counter which is connected to said outputting means.

16. The apparatus of claim 11 wherein said input data signal has a bit rate and said outputting means outputs digital representations of said amplitude modulated carrier signal, said carrier signal having a frequency which is a rational, non-integer multiple of said bit rate.

17. The apparatus of claim 11 wherein said input data signal has a bit rate and said outputting means outputs digital representations of said amplitude modulated carrier signal, said carrier signal having a frequency which is an integer multiple of said bit rate.

18. The apparatus of claim 11 wherein said outputting means comprises a memory.

* * * * *